(12) United States Patent
Mora Ordóñez et al.

(10) Patent No.: US 8,473,261 B2
(45) Date of Patent: Jun. 25, 2013

(54) METHODS AND SYSTEMS FOR IMPROVING MESHES USED IN COMPUTATIONAL FLUID SIMULATIONS

(75) Inventors: Coral Aida Mora Ordóñez, Madrid (ES); Jairo Escudero Guijarro, Madrid (ES); Valentin De Pablo Fouce, Madrid (ES)

(73) Assignee: Airbus Operations S.L., Madrid (ES)

( * ) Notice: Subject to any disclaimer, the term of this patent is extended or adjusted under 35 U.S.C. 154(b) by 1224 days.

(21) Appl. No.: 12/221,043

(22) Filed: Dec. 26, 2007

(65) Prior Publication Data
US 2009/0112527 A1      Apr. 30, 2009

(30) Foreign Application Priority Data
Oct. 25, 2007   (ES) .................................. 200702805

(51) Int. Cl.
*G06F 7/60*    (2006.01)
*G06G 7/50*    (2006.01)

(52) U.S. Cl.
USPC .................................................. 703/2; 703/9

(58) Field of Classification Search
USPC ........................................................ 703/2, 9
See application file for complete search history.

(56) References Cited

U.S. PATENT DOCUMENTS

| | | | |
|---|---|---|---|
| 5,453,934 A  * |  9/1995 | Taghavi et al. ................. | 700/182 |
| 6,445,390 B1 * |  9/2002 | Aftosmis et al. ............... | 345/421 |
| 7,912,681 B2 * |  3/2011 | Narramore et al. ............. | 703/1 |
| 2011/0288831 A1 * | 11/2011 | Tan et al. .......................... | 703/2 |

OTHER PUBLICATIONS

J. Blazek, "Computational Fluid Dynamics: Principles and Applications", Section 3.1, Elsevier, pp. 29-75, 2005.

* cited by examiner

*Primary Examiner* — Kamini S Shah
*Assistant Examiner* — Juan Ochoa
(74) *Attorney, Agent, or Firm* — Ladas & Parry LLP

(57) ABSTRACT

A method of improving a 2D or 3D multiblock-structured mesh of an object that moves through a fluid medium, such as an aircraft. The method is used in the design of the object in connection with a defined analytical scheme, the mesh having been generated with rectangular (2D) or hexahedral (3D) blocks under constraints that may cause the mesh to include irregular blocks comprising the following steps: finding irregular blocks in the mesh; degenerating the irregular blocks merging contiguous edges or sides in one edge or side so that triangular (2D) or pentahedral (3D) blocks are formed and extending the modifications all along the blocks that are propagated; and generating several rectangular (2D) or hexahedral (3D) regular blocks inside the triangular (2D) or pentahedral (3D) blocks. A system for carrying out the method.

8 Claims, 4 Drawing Sheets

| | Defining as irregular blocks (31) those blocks having at least a pair of contiguous sides (2D) or faces (3D) forming an angle A in the range of 120º to 180º, and defining as regular blocks those blocks not having any pair of contiguous sides (2D) or faces (3D) forming an angle A in the range of 120º to 180º. |
|---|---|
| 102 - | |

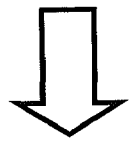

| 104 - | Finding irregular blocks (31) in the mesh. |
|---|---|

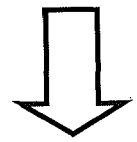

| 106 - | Degenerating the irregular blocks (31) merging contiguous edges or sides (33, 35) in one edge or side (37) so that triangular (2D) or pentahedral (3D) blocks (41) are formed, and extending the merging of contiguous edges or sides (33, 35) in one edge or side (37) all along the irregular blocks (31) that are propagated. |
|---|---|

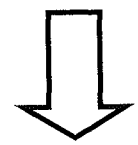

| 108 - | Generating a number N of rectangular (2D) or hexahedral (3D) regular blocks (43, 45, 47) inside said triangular (2D) or pentahedral (3D) blocks (41). |
|---|---|

Fig. 11

METHODS AND SYSTEMS FOR IMPROVING MESHES USED IN COMPUTATIONAL FLUID SIMULATIONS

FIELD OF THE INVENTION

The present invention refers to methods and systems for improving meshes used in Computer Fluid Simulations and more in particular to methods and systems for improving multiblock-structured-meshes used in the design of aircrafts.

BACKGROUND OF THE INVENTION

Nowadays use of Computational Fluid Dynamics (CFD) is extended in the aeronautical industry. In order to reduce investment in Wind Tunnel Tests simulation is increasingly used in design activities.

CFD discretizes the physical domain into small cells where the Navier-Stokes equations or simplifications of them, for example the Reynolds Averaged Navier-Stokes, are computed. That implies that in order to perform a good computation one needs a good mesh. Mesh quality is usually defined by cell deformation or the growing ratio between cells. Also residuals computed in the equations give a good idea of the quality of the computation.

The meshes mainly used in CFD are of three types: entirely structured, totally unstructured or hybrid, that is a mixture of these two mesh types.

Structured meshes are meshes whose connectivity is regular and fixed by the topology: each inner vertex is incident to a fixed number of cells and each cell is delimited by a fixed number of sides and edges. All nodes inside a structured mesh can be located using indexes (l,j,k), so that connectivity is explicit.

Unstructured meshes have a completely arbitrary connectivity: a vertex of the mesh can belong to any number of cells and each cell can have any number of edges or sides. The topological data therefore have to be permanently stored to explicitly know the neighbours of each node. The memory cost involved by the use of an unstructured mesh can therefore become very rapidly penalizing.

For complex geometries structured meshes are divided in several blocks, creating multiblock-structured-meshes in which the actual geometry is formed by several structured blocks, having structurally ordered meshes inside them.

The location and distribution of blocks in the physical domain, i.e. the mesh topology, play a significant role for achieving a good description of the geometry. The connection between blocks is also important due to the node propagation, as block faces propagate the numbers of nodes between two blocks in contact.

Several constrains are usually applied to mesh topology definitions, such as the following:

The need that the topology must mark the limits of the surfaces.

The need that the topology must take into account the geometrical discontinuities of the surfaces.

The need to use a "C" topology around the surfaces caused by a Boundary Layer (BL) behaviour, which appears in CFD equations and other equations. In reference to an airfoil, a "C" topology is defined as a topology that surrounds the airfoil so that mesh refinement is not propagated upstream the airfoil and is only located downstream.

When creating a mesh topology subject to one or more constrains, the mesh may include blocks which do no comply with some quality requirements. A typical mesh quality requirement is that the blocks are as close as possible to perfect squares (2D) or cubes (3D).

In the prior art, two basic options are followed to deal with this type of meshes:

Relaxing the constrains that cause the quality problems.

Working with the mesh and proceeding to a careful evaluation of the results obtained.

These options are not fully satisfactory and the present invention is intended to solve this drawback.

SUMMARY OF THE INVENTION

It is an object of the present invention to provide methods and systems for improving the quality of multiblock-structured-meshes used in the design of objects that move through a fluid medium when the mesh topology is subject to constrains.

It is another object of the present invention to provide methods and systems for improving the quality of multiblock-structured-meshes used in the design of aircrafts.

In one aspect, as shown in FIG. 11, these and other objects are met by providing a method of improving a 2D or 3D multiblock-structured mesh of an object that moves through a fluid medium, such as an aircraft, which is used in the design of said object in connection with a defined analytical scheme, said mesh having being generated with rectangular (2D) or hexahedral (3D) blocks under constrains that may cause that the mesh include irregular blocks not complying with quality requirements, comprising the following steps:

defining as irregular blocks those blocks having at least a pair of contiguous sides (2D) or faces (3D) forming an angle A in the range of 120° to 180° and defining as regular blocks those blocks not having any pair of contiguous sides (2D) or faces (3D) forming an angle A in the range of 120° to 180°;

finding the irregular blocks in the mesh;

degenerating said irregular blocks merging contiguous edges or sides in one edge or side so that triangular (2D) or pentahedral (3D) blocks are formed and extending the modifications all along the blocks that are propagated;

generating a number N of rectangular (2D) or hexahedral (3D) regular blocks inside said triangular (2D) or pentahedral (3D) blocks.

In another aspect, the above-mentioned objects are met by providing a system for improving a 2D or 3D multiblock-structured mesh of an object that moves through a fluid medium, such as an aircraft, which is used in the design of said object in connection with a defined analytical scheme, comprising a computer-implemented 2D or 3D CFD model that includes a module for generating a multiblock-structured mesh of said object with rectangular (2D) or hexahedral (3D) blocks under constrains that may cause that the mesh include irregular blocks having at least a pair of contiguous sides (2D) or faces (3D) forming an angle A in the range of 120° to 180°, and also comprising a module for degenerating said irregular blocks merging contiguous edges or sides in one edge or side so that triangular (2D) or pentahedral (3D) blocks are formed, for extending the modifications all along the blocks that are propagated, and for generating several regular rectangular (2D) or hexahedral (3D) blocks, not having any pair of contiguous sides (2D) or faces (3D) forming an angle A in the range of 120° to 180°, inside said irregular blocks.

Other characteristics and advantages of the present invention will be clear from the following detailed description of embodiments illustrative of its object in relation to the attached figures.

DESCRIPTION OF THE DRAWINGS

FIG. 11 illustrates a flowchart showing a method of the present invention according to an embodiment.

DETAILED DESCRIPTION OF THE INVENTION

An embodiment of a method for improving a multiblock-structured-mesh of an aircraft according to the present invention will now be described.

Figure 1:
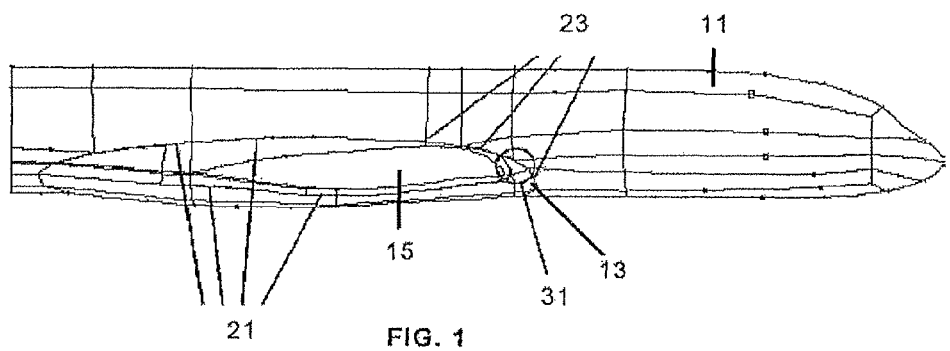
FIG. 1 shows a mesh topology of an aircraft generated applying some constrains.

FIG. 1 shows schematically a mesh topology of the fuselage 11, belly fairing 13 and wing 15 of an aircraft created taking into account several constrains:

The "C" topology 21 needed on the wing 15.

The mark 23 of the belly fairing 13 geometry.

A discontinuity in the belly fairing 13 and fuselage 11 interface.

Figure 2:
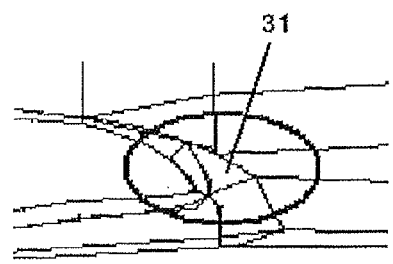
FIG. 2 is an enlarged view of a zone of FIG. 1 with an irregular block.

As a result of these constrains, the mesh includes blocks such as block 31 (see FIGS. 1 and 2) which do not comply with a quality requirement.

Typical quality criteria for this type of meshes refers to the fact that the blocks shall be as close as possible to perfect cubes or squares. There are several mathematical formulas for expressing said criteria setting, for example, that no one of the planar angles is below 20°-30°, or that the angle formed by whatever diagonals of the cubes (or the squares) is not lower than 20°-30°, or that the determinant of the transformation is up to 0.2.

In this invention, it is considered that the quality requirement for a block is that it shall not have any pair of contiguous sides (2D) or faces (3D) forming an angle A in the range of 120° to 180°. The blocks complying with this requirement are called regular blocks and those not complying with it are called irregular blocks.

In another preferred embodiment the angle A is in the range 150-180°.

Starting from a mesh topology such as the mesh shown in FIG. 1 that includes an irregular block 31 the method according to this invention comprises the following steps.

Figure 3:
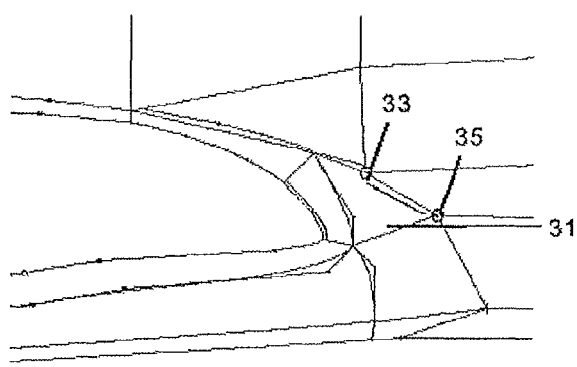
FIG. 3 shows schematically how to degenerate an irregular block according to one step of the method of this invention.
Figure 4:
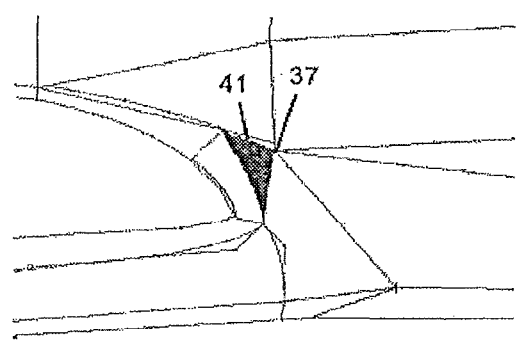
FIG. 4 shows the result of degenerating an irregular block.
Figure 5:
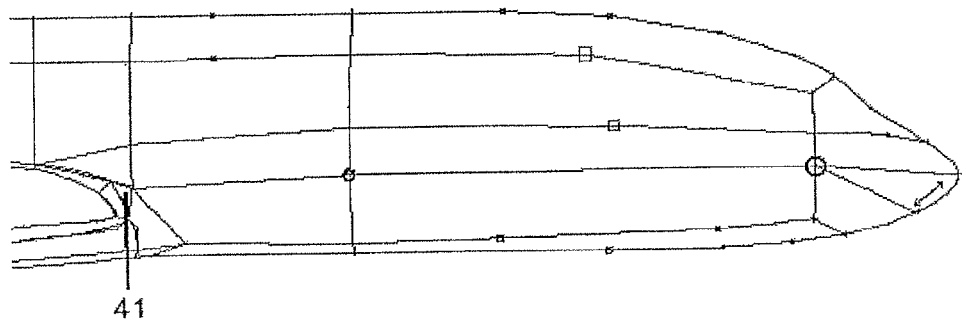
FIG. 5 shows the mesh topology after propagating the degenerated block to all topologically related blocks.

Once the irregular block 31 is found it is degenerated in a triangular (2D) or triangular prism or pentahedron (depending of polyhedron deformation) (3D) block 41 merging the edges or sides 33, 35 in one edge or side 37 (see FIGS. 3 and 4) and extending the modifications all along the blocks that are propagated (see FIG. 5).

Figure 6:
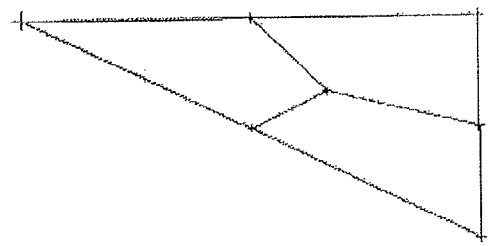
FIG. 6 shows schematically the generation of rectangular blocks inside a triangular block according to one step of the method of this invention.
Figure 7:
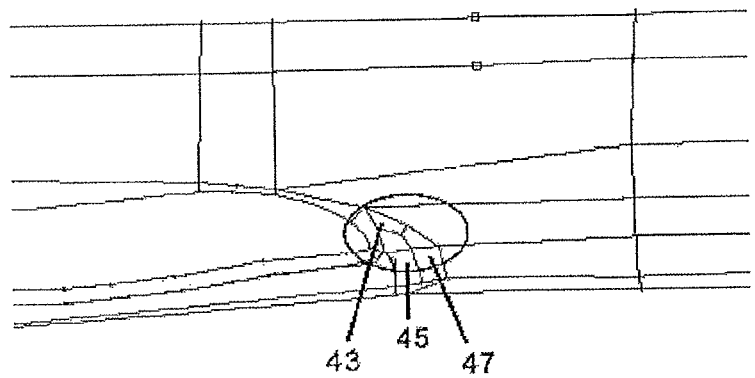
FIG. 7 shows the result of integrating the extra blocks in the global topology according to one step of the method of this invention.
Figure 8:
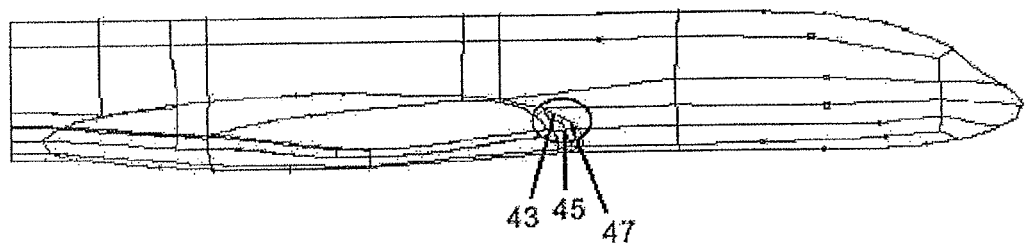
FIG. 8 shows the final improved mesh topology.

Then, extra regular blocks 43, 45, 47 are generated inside block 41. In a preferred embodiment the well-known "O-grid" technique is used. FIG. 6 shows how to create three rectangles inside a triangle for obtaining finally three hexahedral blocks. FIG. 7 shows the result of integrating the new blocks 43, 45, 47 in the global topology and FIG. 8 shows the final topology.

Figure 9:
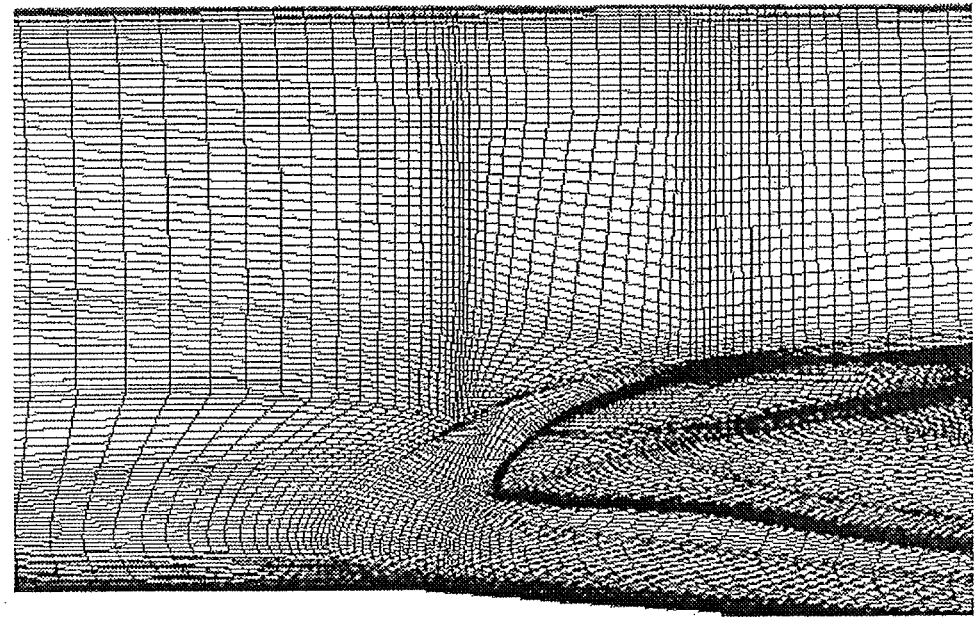
FIGS. 9 and 10 are, respectively, detailed views of the starting mesh and the improved mesh generated according to the method of this invention.
Figure 10:
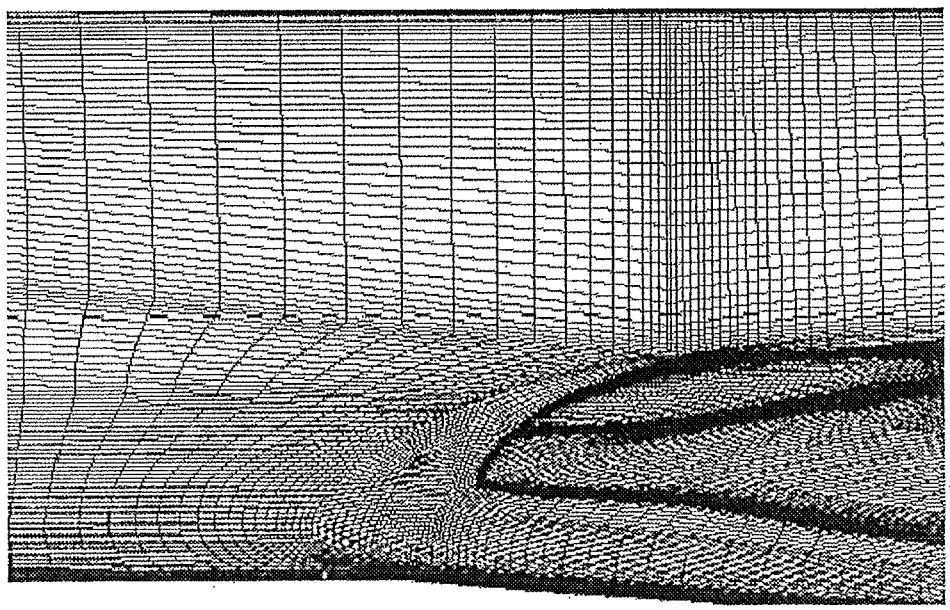

Comparing the starting mesh (FIG. 9) with the improved mesh according to the method of the present invention (FIG. 10) the better quality of the latter can be easily appreciated.

A system for improving a multiblock-structured-mesh of an aircraft carrying out the above-describe method comprises a computer-implemented 2D or 3D model that includes a first module for the generation of a multiblock-structured-mesh of the aircraft with rectangular (2D) or hexahedral (3D) blocks under constraints that may cause that the mesh include irregular blocks (31) and a second module for improving said mesh. This model can be implemented using the commercial software package ANSYS ICEM CFD.

Using the first module, the mesh is generated, defining a block topology around the needed geometry, marking the aircraft geometry (limits of parts, discontinuities, . . . ) and using the "C" topology technique to take care of the Boundary Layer behaviour needed for a good CFD description.

The second module is a module that allows improving said mesh performing the above mentioned steps: finding irregular blocks 31; degenerating said irregular blocks 31 in triangular (2D) or pentahedral (3D) blocks 41 and generating several rectangular (2D) or hexahedral (3D) regular blocks 43, 45, 47 inside said triangular (2D) or pentahedral (3D) blocks 41. This module uses ICEM Hexa techniques such as control points and bunching improvement.

The final result (files with the block mesh nodes) can be used as input for other software package for further refinements and/or for conversion to the format needed for any CFD software package, for instance the elsA package to obtain the flow solution needed.

Modifications may be introduced into the preferred embodiment just set forth, which are comprised within the scope defined by the following claims.

The invention claimed is:

1. A method of improving a 2D or 3D multiblock-structured mesh of an object that moves through a fluid medium, which is used in the design of said object in connection with a defined analytical scheme, said mesh generated with rectangular (2D) or hexahedral (3D) blocks under constraints that may cause the mesh to include irregular blocks (31) not complying with quality requirements, said method comprising the following steps:

defining as irregular blocks (31) those blocks having at least a pair of contiguous sides (2D) or faces (3D) forming an angle A in the range of 120° to 180° and defining as regular blocks those blocks not having any pair of contiguous sides (2D) or faces (3D) forming an angle A in the range of 120° to 180°;

finding irregular blocks (31) in the mesh;

degenerating said irregular blocks (31) merging contiguous edges or sides (33, 35) in one edge or side (37) so that triangular (2D) or pentahedral (3D) blocks (41) are formed, and extending the merging of contiguous edges or sides (33, 35) in one edge or side (37) all along blocks that are propagated; and generating a number N of rectangular (2D) or hexahedral (3D) regular blocks (43, 45, 47) inside said triangular (2D) or pentahedral (3D) blocks (41).

2. A method according to claim 1, wherein said constraints are at least one of the following:

the analytical scheme includes a boundary layer behavior, the object geometry includes discontinuities, and the mesh topology must mark the limits of the object surfaces.

3. A method according to claim 1, wherein said angle A is in the range of 150° to 180°.

4. A method according to claim 1, wherein said number N is three.

5. A method according to claim 4, wherein the three rectangular (2D) or hexahedral (3D) regular blocks (43, 45, 47) generated inside said triangular (2D) or pentahedral (3D) blocks (41) are created following an O-grid technique.

6. A method according to claim 1, wherein said object is an aircraft.

7. A system implemented on a computer for improving a 2D or 3D multiblock-structured mesh of an object that moves through a fluid medium, which is used in the design of said object in connection with a defined analytical scheme, said system comprising a computer-implemented 2D or 3D CFD model that includes a module for generating a multiblock-structured mesh of said object with rectangular (2D) or hexahedral (3D) blocks under constraints that may cause the mesh to include irregular blocks (31) having at least a pair of contiguous sides (2D) or faces (3D) forming an angle A in the range of 120° to 180°, wherein said model also comprises a module for degenerating said irregular blocks (31) merging contiguous edges or sides (33, 35) in one edge or side (37) so that triangular (2D) or pentahedral (3D) blocks (41) are formed, and extending the merging of contiguous edges or sides (33, 35) in one edge or side (37) all along blocks that are propagated and for generating several regular rectangular (2D) or hexahedral (3D) blocks (43, 45, 47), not having any pair of contiguous sides (2D) or faces (3D) forming an angle A in the range of 120° to 180°, inside said irregular blocks.

8. A system according to claim 7, wherein said object is an aircraft.

* * * * *